(No Model.) 2 Sheets—Sheet 1.
B. E. HIESTAND & A. W. SWADE.
DEVICE FOR RELEASING ANIMALS FROM STALLS.
No. 322,603. Patented July 21, 1885.
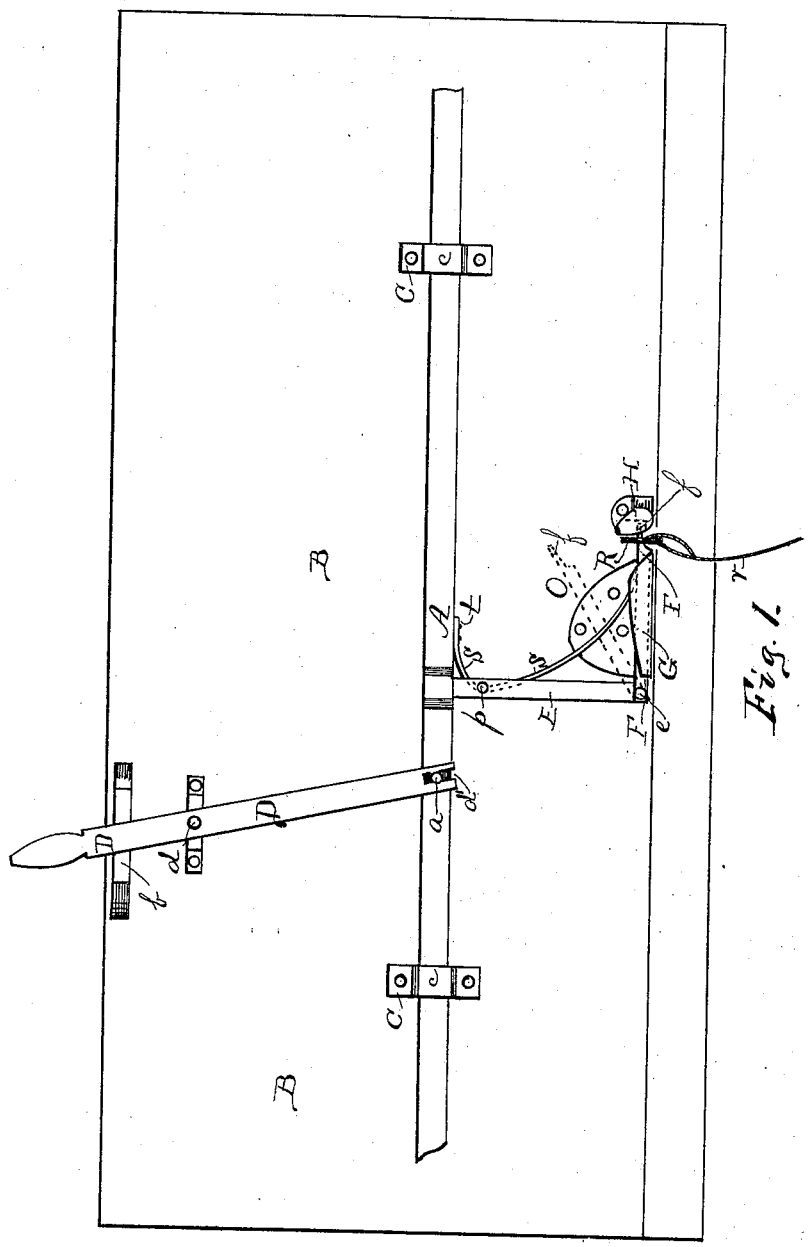

(No Model.) 2 Sheets—Sheet 2.

B. E. HIESTAND & A. W. SWADE.
DEVICE FOR RELEASING ANIMALS FROM STALLS.

No. 322,603. Patented July 21, 1885.

Witnesses
Alexander Harris
John S. Rohrer

Inventors
Benj. E. Hiestand
Amos W. Swade
Wm. R. Gerhart
Their Atty.

UNITED STATES PATENT OFFICE.

BENJAMIN E. HIESTAND AND AMOS W. SWADE, OF MOUNT JOY, PA.

DEVICE FOR RELEASING ANIMALS FROM STALLS.

SPECIFICATION forming part of Letters Patent No. 322,603, dated July 21, 1885.

Application filed November 18, 1884. (No model.)

*To all whom it may concern:*

Be it known that we, BENJAMIN E. HIESTAND and AMOS W. SWADE, citizens of the United States, residing at Mount Joy, in the county of Lancaster, and State of Pennsylvania, have invented certain Improvements in Devices for Releasing Animals from Stalls, of which the following is a specification.

Our invention relates to improvements in devices for releasing animals from stalls; and the object of our improvement is to release all the animals in the stall at once, if necessary or desirable, or to loosen them one by one. We obtain this object by means of the mechanism illustrated in the accompanying drawings, in which—

Figure 3:
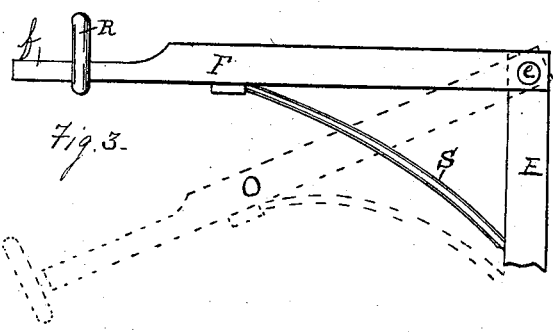
Figure 2:
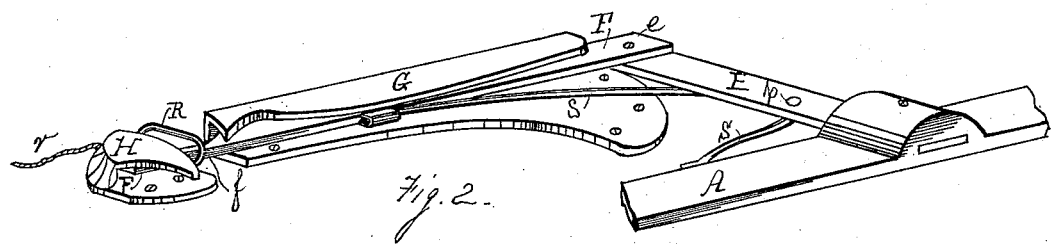
Figure 4:
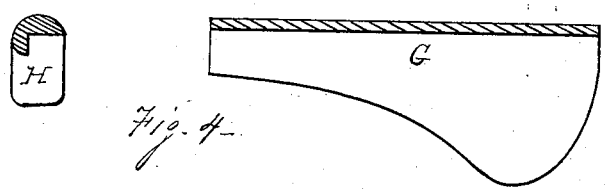

Figure 1 shows a view of the under side of the trough with our device attached; Fig. 2, a perspective view of the mechanism for detaching the animals; Fig. 3, a top view of the arm and latch, and Fig. 4 a top view of the slotted lug and hasp with their top plates removed.

Our device is placed under the bottom of the trough or troughs, and consists of the following elements: A main rod or bar, A, extends lengthwise under the trough B, to which it is held by means of plates C, having slotted lugs $c$, in which the bar rests and through which it slides.

D represents a hand-lever, having its fulcrum at $d$, and a slot, $d'$, at its inner end, which engages a pin, $a$, projecting from the bottom of the bar A. Along or near the edge of the trough the handle of the lever is held out from the bottom of said trough by a flange, $b$. There is an arm, E, rigidly attached to the rod A, opposite each stall, and which projects toward the stall. Each of the said arms E has a latch, F, pivoted at its outer end at $e$, which rests in and is guided by a groove in lug, G, attached to the bottom of the trough. The free end $f$ of the latch F projects considerably beyond the end of the lug G and engages the hasp H, also fastened to the bottom of the trough. A halter-ring, R, is attached to the latch between the lug and the hasp, to which is secured the rope $r$, by which the animal is tied. A spring, S, passing around a pin, $p$, in the arm E and fastened to the rod A at $t$ holds the latch in its place in the groove of the lug G.

The operation of our device is as follows: To free all the animals the rod A is moved by means of the lever so as to draw the latch of each stall back and disengage it from the hasp, the end of the sides of the grooves pushing the ring free from the latch; and to loosen a single animal the latch is pulled out from its hasp, as shown from the dotted lines at O, and the halter-ring removed, the latch upon being freed being forced back to its original position by the spring.

We do not confine ourselves to the use of the lever D in order to move the sliding rod A, as there are other well-known methods by which it can be done.

What we claim as our invention, and desire to secure by Letters Patent, is—

The combination, with the sliding rod A, of the rigid arm E, the latch F, pivoted to said arm, the slotted lug G, the spring S, and the hasp H, constructed to operate substantially as specified.

B. E. HIESTAND,
A. W. SWADE.

Witnesses:
A. GERBER,
I. S. LONGENECKER.